United States Patent [19]

Line et al.

[11] Patent Number: 5,584,584
[45] Date of Patent: Dec. 17, 1996

[54] BEARING ASSEMBLY WITH A SPLINED INNER RACE

[75] Inventors: Don Line, Coldwater, Ohio; Al Uetz, Charles City, Iowa

[73] Assignee: Agco Corporation, Duluth, Ga.

[21] Appl. No.: 443,085

[22] Filed: May 17, 1995

Related U.S. Application Data

[62] Division of Ser. No. 345,222, Nov. 28, 1994, Pat. No. 5,441,944, which is a continuation of Ser. No. 49,831, Apr. 19, 1993, abandoned.

[51] Int. Cl.$^6$ ................................................ F16C 43/00
[52] U.S. Cl. .......................................... 384/537; 384/585
[58] Field of Search .................................. 384/537, 546, 384/559, 561, 584, 585, 460

[56] References Cited

U.S. PATENT DOCUMENTS 3,052,956  9/1962  Daugherty ............................ 384/537 X
3,066,000  11/1962  James et al. ........................... 384/537
3,405,982  1/1968  Krenn ..................................... 384/537
5,178,472  1/1993  Lawson ................................. 384/585 X
5,195,402  3/1993  McMillen et al. ................... 74/665 GC
5,211,489  5/1993  Moore ..................................... 384/585

FOREIGN PATENT DOCUMENTS 1372802  8/1964  France ................................... 384/585
1170165  11/1969  United Kingdom .................. 384/548

Primary Examiner—Thomas R. Hannon
Attorney, Agent, or Firm—Lockwood, Alex, FitzGibbon & Cummings

[57] ABSTRACT

A bearing assembly includes an outer race, an inner race, a plurality of rolling elements, such as bearing balls positioned in a raceway between the outer race and the inner race. The inner race has a series of splines which extend radially inwardly of the spline, the splines increase the amount of surface area which extends radially, or normal to the inner race to contact a similarly configured shaft member. The splined inner race eliminates reduces pounding or knocking noises associated with hexagonal bearings.

24 Claims, 5 Drawing Sheets

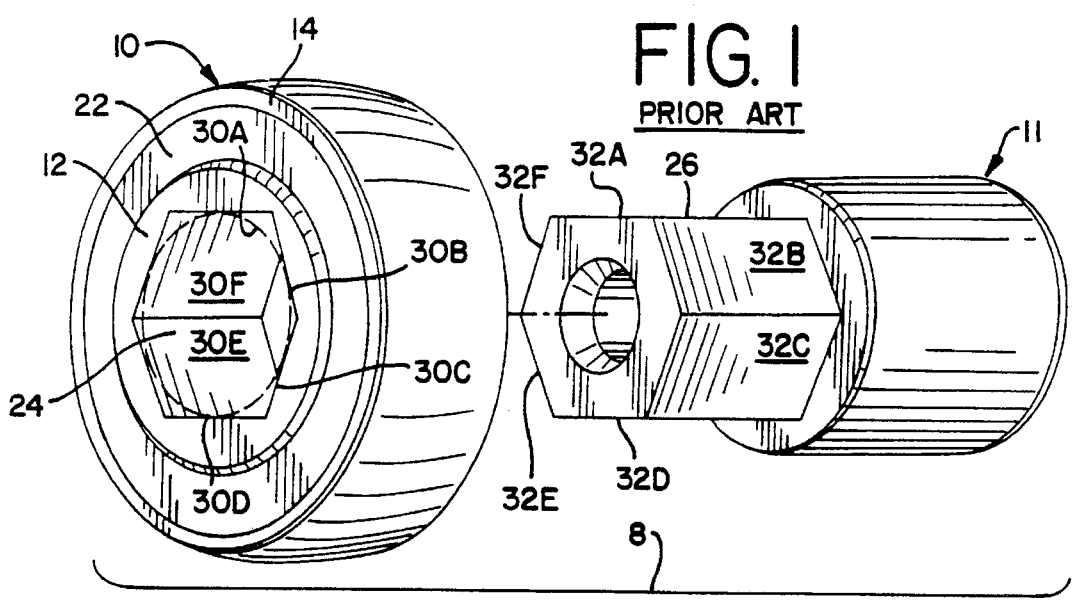
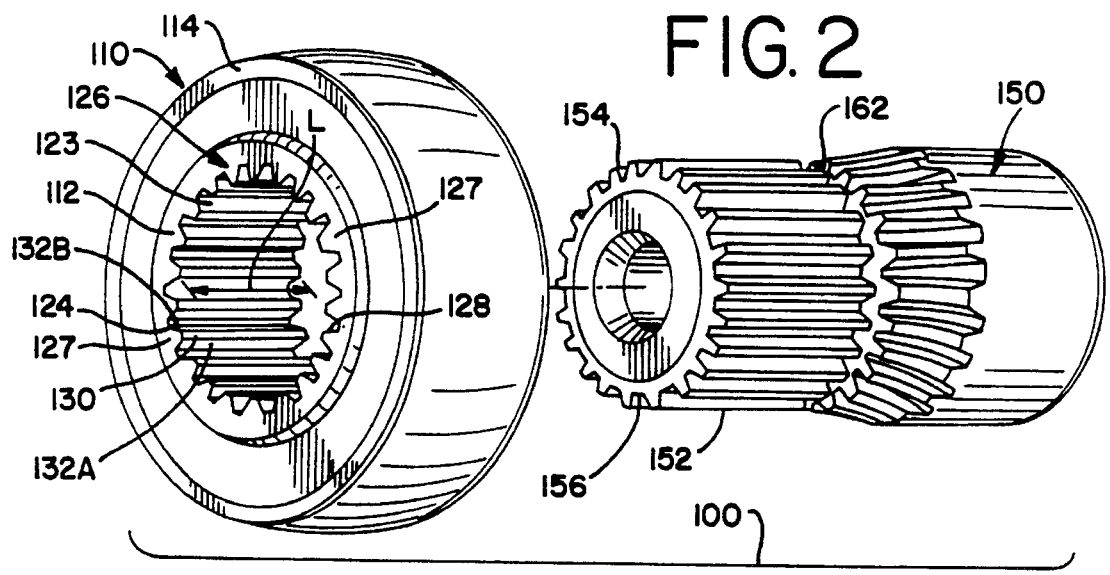
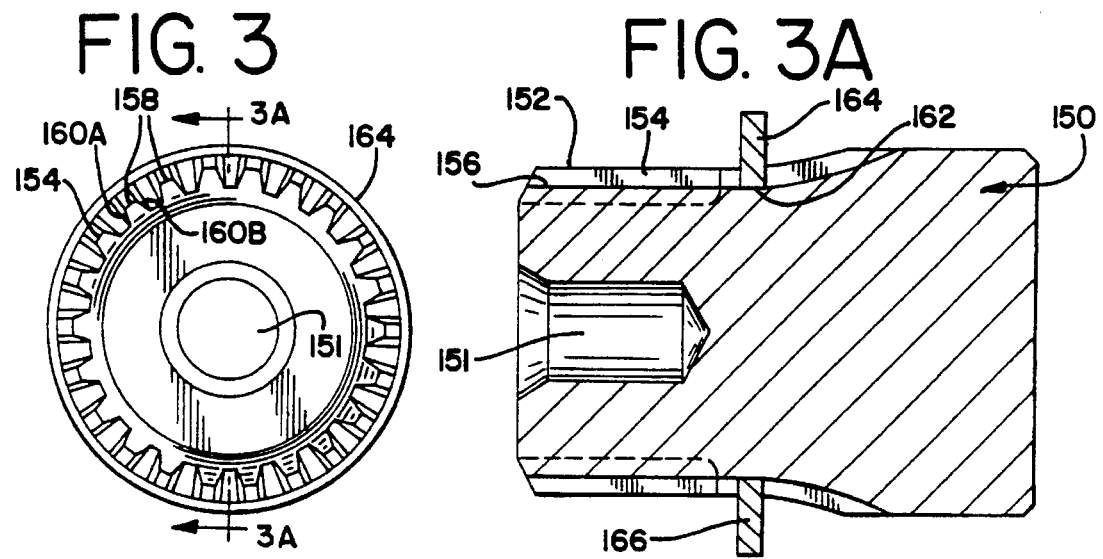

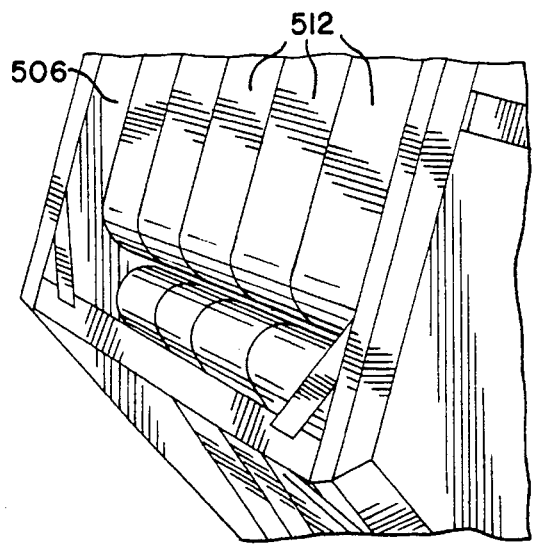
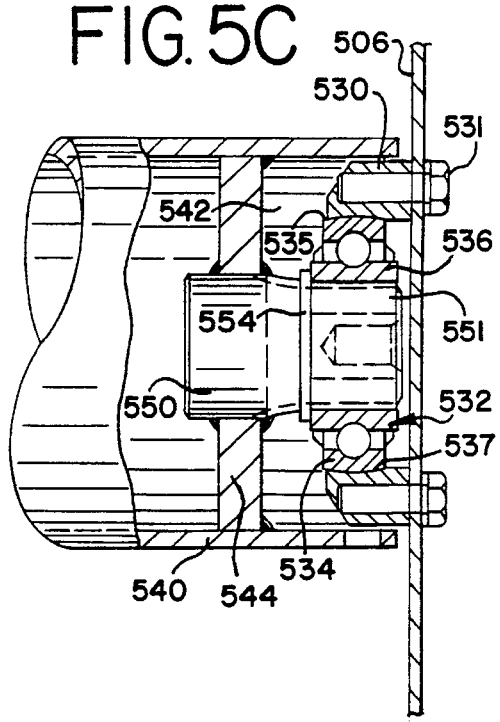
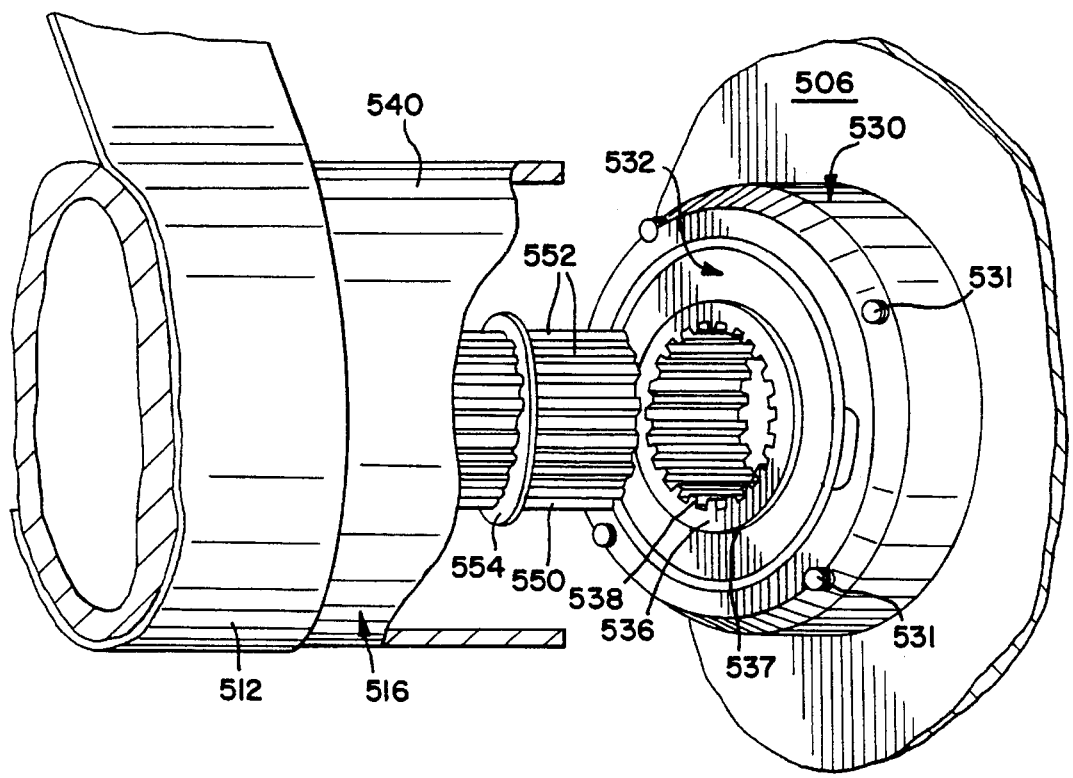

BEARING ASSEMBLY WITH A SPLINED INNER RACE

REFERENCE TO RELATED APPLICATION

This application is a divisional application of prior application of Ser. No. 08/345,222, filed Nov. 28, 1994, now U.S. Pat. No. 5,448,944, which is a continuation of prior application Ser. No. 08/049,831, filed Apr. 19, 1993, now abandoned.

BACKGROUND OF THE INVENTION

The present invention relates to anti-friction bearings and assemblies therefor, and more particularly to bearings which operate under conditions characterized by extreme performance demands such as high radial loads and long lifetime requirements.

Anti-friction bearings are often used in a variety of applications in which the bearing assemblies experience high external loads during operation. Externally applied loads generate contact stress between the raceways and the loaded rolling elements. Excessive radial loads on bearings are detrimental to bearing life. In some applications, bearing assembly misalignment can develop under certain loading conditions. Unwanted operational noises can be experienced, particularly during these types of high loading conditions.

One such application during which high loads are developed is on agricultural equipment. Agricultural equipment must effectively process a high volume of agricultural product in short times during harvests under conditions characterized by a high concentration of particulate matter, such as dirt, dust, moisture and plant particles. Exemplary of agricultural equipment in this regard are hay balers. One type of hay baler, a round baler, has a baling chamber defined by a number of sidewalls and has a series of rotating endless belts which roll and compact hay and forage material together into a large, round bale. The rollers extend between the baler sidewalls and drive the endless belts. The rollers are typically chain or belt driven. Each roller may be mounted in the baling chamber with one or more bearings located at opposite ends of the roller. Some current hay balers utilize bearings with hex-shaped inner races which engage complimentarily-shaped hexagonal shafts extending out from the ends of the rollers. These bearings have been known to exhibit a loud and annoying "pounding" or "knocking" noise during operation of hay balers. This pounding or knocking is believed to be caused by the constant loading and unloading of the baler rollers during the forming of hay bales within the baling chamber. As the density of the bale grows, it exerts forces on the sidewalls of the baler which can cause the bearings to become misaligned. It is believed that the knocking or pounding noise occurs when the bearings are misaligned.

In hay baler applications and particularly round hay baler applications, it is also desirable to allow a certain amount of axial movement between the shaft and inner race of the bearing assemblies to reduce or eliminate the axial or thrust loads borne by the bearing assembly and to allow for easier assembly. Accordingly, in attempting to solve problems such as undesirable noise development and in seeking ways to better handle high bearing loads, one must also allow for and take into account this axial movement when working on these types of devices.

SUMMARY OF THE INVENTION

The present invention is directed first to a unique bearing, and second to a unique bearing assembly having a bearing component and a shaft component. The bearing and bearing assembly of the present invention overcome the above-mentioned disadvantages and provide beneficial operational results.

The present invention resides in the inner race of the bearing having a plurality of radial inwardly extending splines. The inner race engages a shaft member which has a similar number of external, radially extending splines on an engagement portion thereof. The bearing inner race and shaft member splines are separated by a series of intervening channels, such that each spline has a top land portion and two opposing face portions defined thereon. Preferably, the splines have an involute configuration.

The splined inner race of the bearing is believed to result in a more effective transmission of torque to the bearing because the splines provide a greater number of contact points on the bearing, as compared to conventional hex-shaped bearings. Thus, the force at each contact point is reduced.

This splined bearing inner race structure also has been found to beneficially eliminate the bearing knocking or pounding noise observed in equipment incorporating conventional bearings having hex-shaped inner races. Additionally, the splined bearing structure exhibits advantageous self-centering characteristics. Splined bearing structures also further advantageously permit limited axial movement between the shaft and the bearing to reduce thrust loads while still resisting high radial loads.

Accordingly, it is a general object of the present invention to provide a new and improved bearing assembly.

A further object of the present invention to provide an improved bearing which has particular utility in the area of agricultural machinery and which reduces bearing knocking or pounding.

Another object of the present invention is to provide a bearing assembly for a round hay baler which reduces bearing pounding or knocking noise wherein the bearing has a splined inner race member which engages a similarly configured shaft member.

Yet another object of this invention is to provide a bearing assembly having improved centering characteristics of the shaft within the inner race.

Still another object of the present invention is to provide a bearing which is especially suitable for high radial load applications.

It is still another object of this invention to provide a splined bearing assembly secured to an agricultural machine, wherein the splines reduce the loadings at each interface between the shaft and inner race of the bearing assembly to provide especially advantageous centering characteristics of the shaft within the inner race.

Yet another object of the present invention is to provide an improved bearing for use in agricultural machines, the bearing having splines permitting a limited amount of axial movement between the bearing and a shaft inserted into the bearing opening.

Other objects and advantages, and the manner of their attainment will become more clearly apparent from the following detailed description of the preferred embodiment of the invention, and by reference to the drawings, in which like reference numerals indicate corresponding parts throughout.

3

BRIEF DESCRIPTION OF THE DRAWINGS

FIG. 1 is an exploded perspective view of a hexagonal bearing assembly representative of the prior art;

FIG. 2 is an exploded perspective view of the bearing assembly constructed in accordance with the principles of the present invention;

FIG. 3 is an end view of the shaft member of the bearing assembly illustrated in FIG. 2;

FIG. 3A is cross-sectional view of the bearing shaft illustrated in FIG. 3, taken along lines 3A—3A;

FIG. 5A is an enlarged view of a rear portion of the exterior of the hay baler of FIG. 5;

FIG. 5B is an exploded perspective view of a roller and associated bearing of the baler of FIG. 5;

FIG. 5C is a sectional view of the roller and bearing of FIG. 5B shown in an engaged position;

DETAILED DESCRIPTION OF THE PREFERRED EMBODIMENTS

Figure 1A:
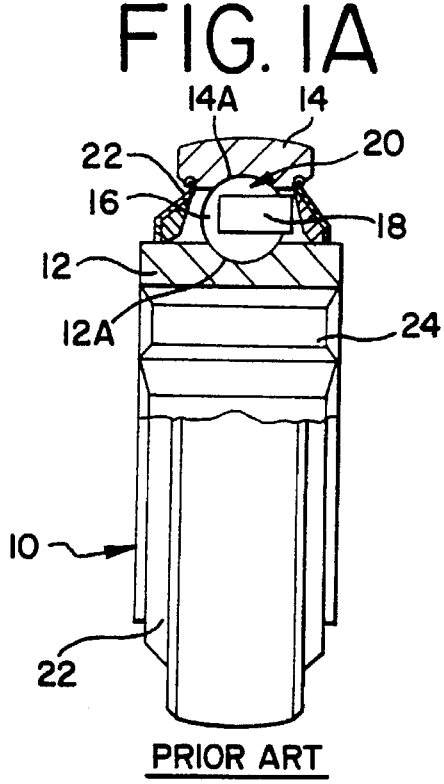
FIG. 1A is a perspective view of the bearing of FIG. 1 in partial section.

FIGS. 1 and 1A illustrate a conventional anti-friction bearing assembly 8 having a bearing component 10 and a shaft component 11, which assembly is exemplary of prior art bearing assemblies. Bearing component 10 includes four parts typically associated with an anti-friction bearing, namely an inner race or ring member 12, an outer race or ring member 14, a plurality of rolling members, such as balls 16, and a cage or separator 18. The inner and outer race member each includes a respective semicircular groove 12A and 14A which defines a raceway 20 which, when the bearing 10 is assembled, extends between the inner and outer race members 12 and 14 for the entire appropriate circumferential portion thereof. The balls 16 and cage 18 are located in this raceway 20. The radius of the grooves 12A, 14A may be typically slightly larger than the radius of the balls 16 such that a slight amount of radial clearance exists. The bearing 10 is thus permitted to adjust itself to small amounts of angular misalignment in the bearing assembly. Bearing assembly 10 may also include one or more seals or shields 22 which enclose and protect the bearing raceway 20.

The bearing assembly 10 may be press-fit into an outer housing (not shown) which locates the bearing in its proper position. As shown best in FIG. 1, the bearing inner race member 12 has a hexagonal shaft opening 24. This hex shaft opening 24 receives a complementarily configured hex-shaped end portion 26 of the shaft component 11 which ensures that the bearing inner race member 12 rotates with the shaft 26. In such a construction, the shaft end 26 is typically slip fit into the inner race hex opening 24. The hex inner race opening 24 has six engagement surfaces 30A–F which contact opposing shaft member engagement surfaces 32A–F. When a torque is applied to the shaft component 11, the contact between these two engagement surfaces 30 and 32 results in rotation of the inner race 12 within the bearing 10. As seen in FIG. 1B, the inner race engagement surfaces 30A–F of the conventional hex bearing 10 are oriented more tangential than normal to a base circle line scribed in the hex opening 24.

Figure 2A:
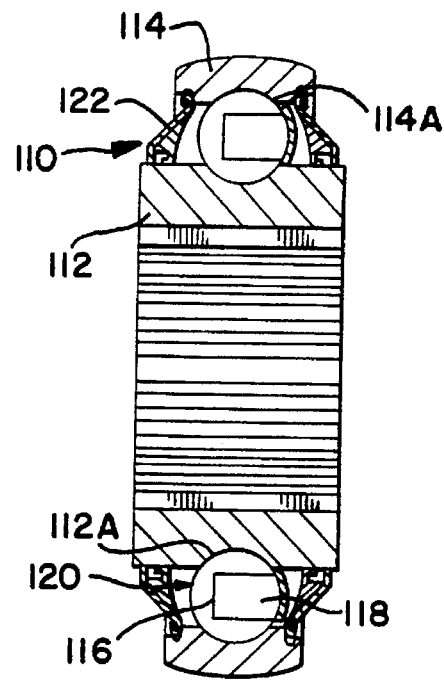
FIG. 2A is a perspective view, partially in section, of the bearing of FIG. 2.

FIGS. 2 and 2A illustrate a bearing assembly 100 constructed in accordance with the principles of the present invention. The bearing assembly 100 shown includes a bearing component 110 and a shaft component 150. The bearing component 110 has an inner race or ring member 112, an outer race or ring member 114 and a plurality of rolling elements, such as balls 116 separated by a cage or separator 118. (FIG. 2A.) The balls 116 are disposed between two semicircular grooves 112A, 114A positioned in the opposing surfaces of the respective inner race and outer race members 112, 114, which together define a raceway 120 for the rolling elements 116. The bearing component 110 may include an appropriate means for sealing the raceway 120 such as a seal member 122.

Figure 6:
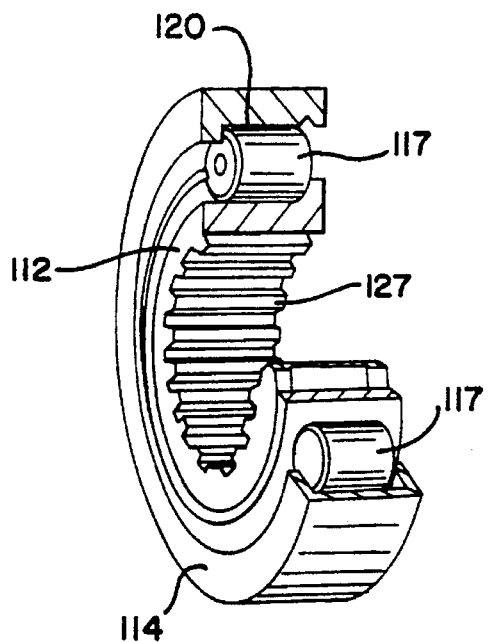
FIG. 6 is a perspective view, partially broken away, of an alternate embodiment of a bearing constructed in accordance with the principles of the present invention.

As shown in the embodiment of FIG. 6, the bearing may also use rollers 117 as its rolling elements. Similar to balls 116, the rollers are disposed in the raceway 120 between the inner race 112 and the outer race 114. The rollers 117 may be cylindrical rollers as shown or they may include conventional spherical rollers.

In an important aspect of the present invention, the bearing inner race 112 has a shaft opening 123 which has a splined configuration or profile 124 which includes a plurality of radially extending shaft engagement members 126. The engagement members are illustrated as splines 127 and are separated from each other by intervening channels 128. In the embodiment illustrated in FIG. 2, twenty-two of such splines 127 are shown and a similar number (twenty-two) of intervening channels 128 are illustrated. The splines 127 extend radially inwardly of the inner race 112 for a predetermined extent and also extend longitudinally for a predetermined distance L of the inner race member 112. Each spline 127 includes a top land portion 130 located at the outermost radial extent of the spline 127. The spline 127 has two face portions 132A, 132B located on opposite sides of the top land 130. The face portions of adjoining splines 127 of the inner race 112 define the intervening channels 128 of the inner race 112.

Figure 7:
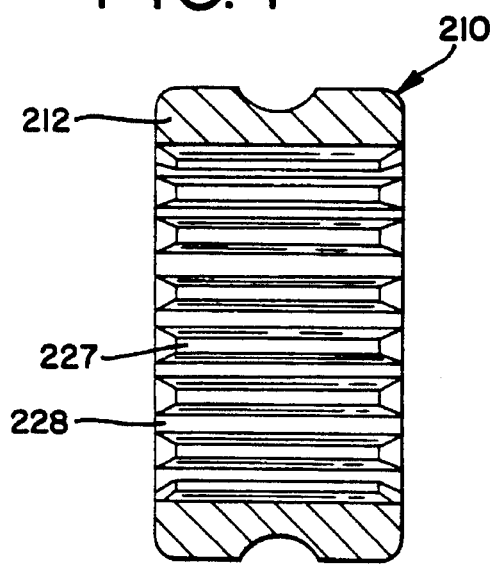
FIG. 7 is a sectional view of another embodiment of a bearing according to the present invention; and, FIG. 8 is yet another embodiment of a bearing according to the present invention.

The splines 127 may have generally the same length as their associated intervening channels 128, or as shown in the embodiment of FIG. 7 the length may be variable. For example, the bearing 210 in FIG. 7 has an inner race member 212 with channels 228 longer than splines 227.

Figure 8:
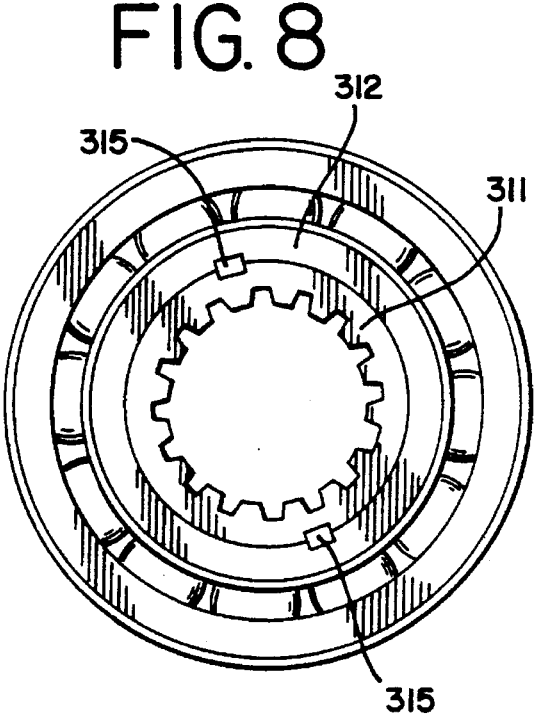

Inner race 112 may be formed from a block of suitable material, such as steel, and the splines 127 of the inner race member 112 may be integral with the inner race member 112 as shown in FIGS. 2–2A. However, as illustrated in the embodiment of FIG. 8, the splines may also be formed on a separate circular spline member 311 which is then attached to the inner race member 112 in a manner which prohibits relative rotation between the inner race member 312 and the spline member 311, such as by a key 315 or press fit.

With particular reference to FIG. 3 and FIG. 3A, the shaft component 150 has an end portion 152 which has a series of external, radially outwardly extending splines 154 equal in number to those present on the inner race 112 of the bearing component 110. The shaft component 150 may have an axial cavity 151 positioned in its center which may receive a projecting stud or similar member on a mounting surface (not shown). Splines 154 extend for a predetermined distance along the end portion 152 of the shaft 150 and are separated by intervening channels 156. The shaft component splines 154 include top land portions 158 at their outermost radial extent and have two face portions 160A, 160B on opposing sides thereof. The shaft component end portion 152 typically further includes suitable means for limiting axial movement of the shaft component 150 in the bearing component inner race opening 123. Illustrative in this regard is a circumferential groove 162 which receives a stop member, such as a snap ring 164, to provide a stop surface which prevents axial movement of the shaft into the inner race opening 123 for a distance greater than the distance from the end of the shaft 150 to the innermost surface 166 of the stop member 164. The opposite end 151 of the shaft component 150 may be configured to permit its attachment to a rotatable member (not shown) such as by welding.

Figure 4B:
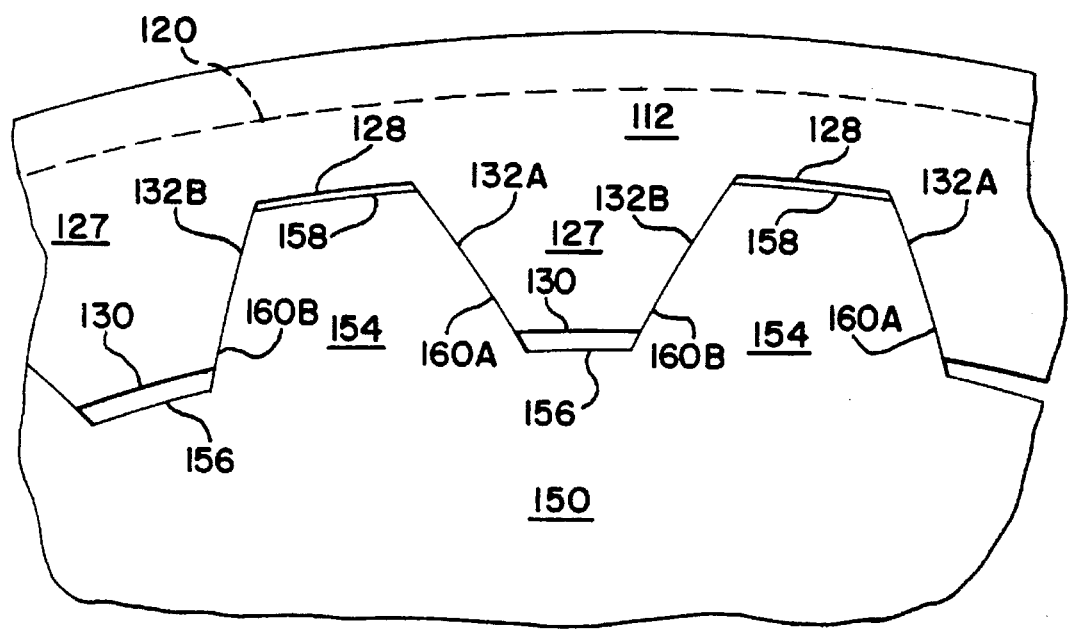
FIG. 4B is an enlarged view of a portion of the inner race of FIG. 4.

In another important aspect of the present invention, the splines 127 are formed on the inner race 112 in an arcuate manner, and preferably as involute splines. The involute characteristic of the splines 127 is shown best in FIG. 4B, which is an enlarged view of a portion of the inner race member 112. Similarly, the splines 154 of the shaft member are also preferably formed as involutes which are complementary in configuration to the involute splines 127 of the inner race 112. With further reference to FIG. 4B, the faces 132A, 132B of the inner race splines 127 are generally parallel to corresponding faces of the external splines 154 of the shaft component 150. It has been found that a pressure angle of approximately 30° used in forming the splines 127, 154 and a pitch of 16/32 gives particularly desirable results.

The spline face portions of the inner race 112 preferably provide the bearing inner race 112 with multiple torque-transmission surfaces or contact points which are oriented more normally than tangentially as compared with the hex-shaped bearing assembly 8 of FIGS. 1 and 1A. In this regard, the splines 127 may also take other similar configurations such as square splines. Because there are more contact points in the splined bearing, the loads on each contact point are reduced as compared to the hex-shaped bearing assembly described above. Thus, the bearing assembly 100 of the invention functions reliably under high radial loading of the bearing component 110. Because of the splined nature of the bearing inner race 112 and the shaft end portion 152, axial movement is also permitted between the two components, thereby reducing any thrust loading on the bearing component 110 by the shaft component 150.

Figure 5:
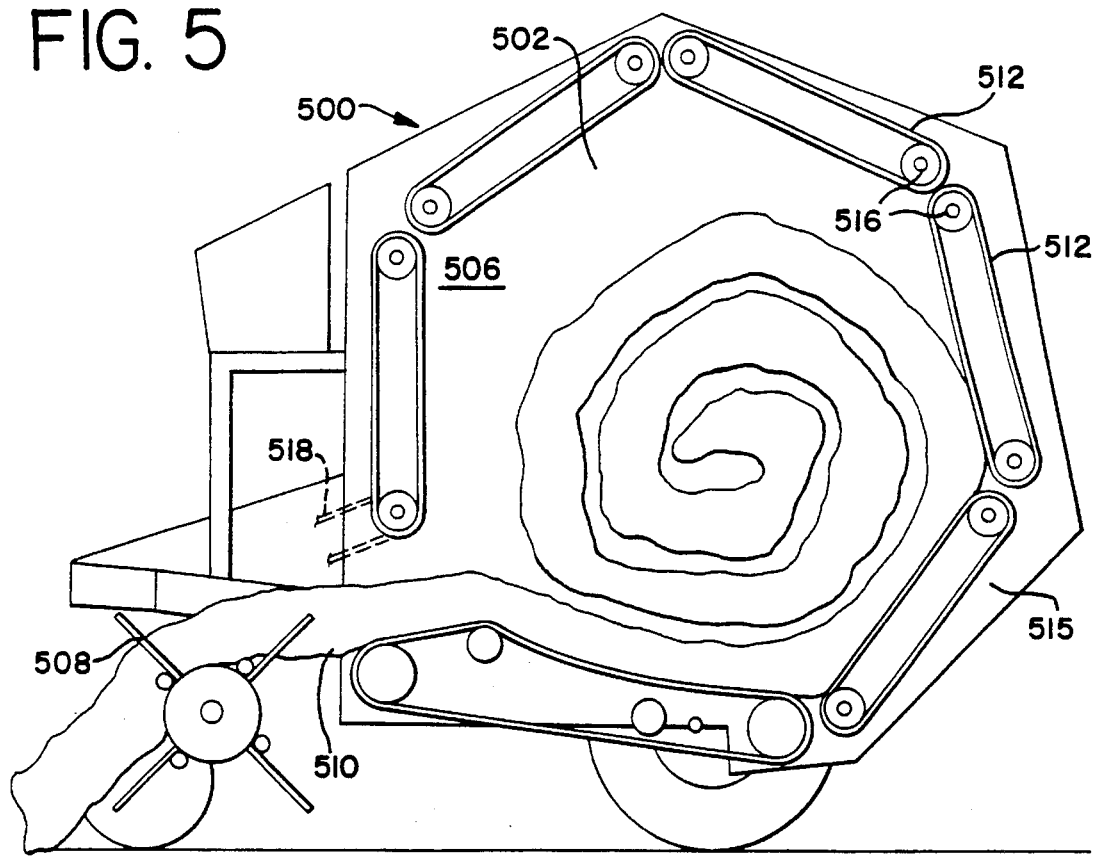
FIG. 5 is a cutaway schematic view of a round hay baler utilizing the bearing assembly of FIG. 2.
Figure 4:
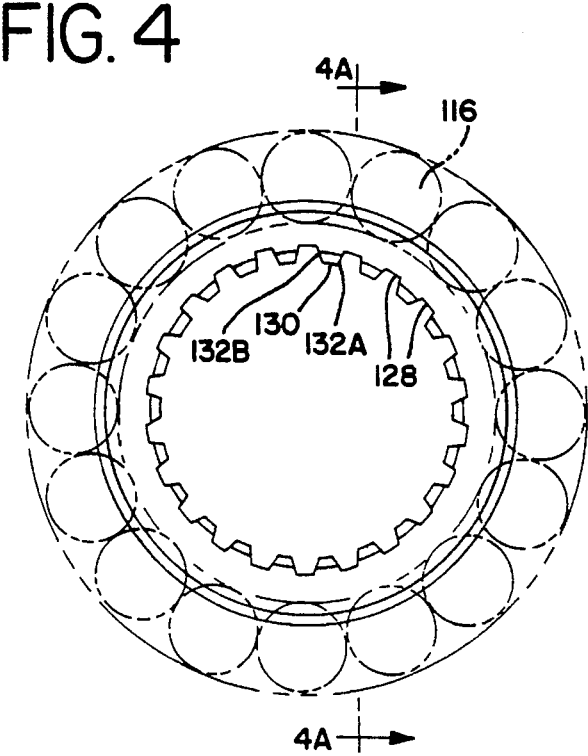
FIG. 4 is a plan view of the inner race of the bearing component of the bearing assembly illustrated in FIG. 2 with the ball bearings shown in phantom.
Figure 4A:
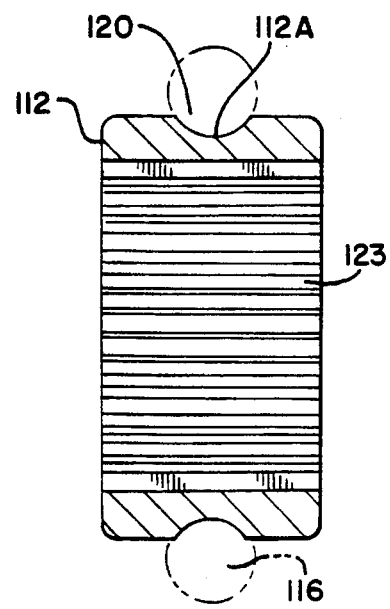
FIG. 4A is a sectional view of the inner race illustrated in FIG. 4 taken along lines 4A—4A.

The bearing assembly 100 of the present invention has proven to be useful in agricultural machinery and particularly in the operation of hay balers such as illustrated in FIGS. 5 and 5A. It will be understood that the present invention is not limited to the specific illustrated baler. Also, the bearing assembly 100 of the present invention is suitable for use on other types of agricultural equipment or machinery with rotating members.

A round hay baler, generally designated 500 in FIG. 5, has a baling chamber 502 into which the hay is gathered and formed into a round bale. Baling chamber 502 is generally defined by baler sidewalls 506. The hay is propelled into the baling chamber 502 by a suitable pick-up assembly, including, for example rotating feeder arms 508 positioned generally at a front opening 510. Bale forming proceeds in a generally known manner within a bale forming chamber which may be either fixed or variable. Typical fixed chamber balers include either a series of rollers (not shown) or a series of endless, rotatable belts 512 positioned around rollers mounted along the periphery of the baling chamber 502 and extending between the baler sidewalls 506. Once formed, the bale exits through a tailgate 515 hinged to the baling chamber 502.

The bale forming belts typically are driven by a series of rollers 516 which are driven by a conventional drive assembly which may include, for example, a chain drive 518. (FIG. 5A.) The rollers 516 are mounted to or through the baler sidewalls 506. This mounting includes a bearing and may be accomplished in a variety of ways. As shown in FIG. 5B, a housing member 530 is attached to the baler sidewall 506, by any suitable means such as multiple bolts 531 or by welding.

Housing 530 contains a bearing component 532 having an outer race member 534 with a spherical outer surface 535, an inner race member 536 and a plurality of rolling elements (not shown) positioned therebetween in a raceway (also not shown). Similar to the outer race member 534, the cavity 537 is preferably spherical in nature (FIG. 5C) and thus permits some relative movement between the outer race member 534 and housing 530 to permit installation of the bearing component 532 into the housing 530 as well as alignment of the outer race 534 during operation of the baler.

The bearing component 532 may also be mounted in a conventional manner which permits rotation of the outer race member 534 relative to the inner race member 536, such as by attaching the roller shaft to the baler sidewall 506. Or, it may be mounted as shown in FIG. 5C where the bearing housing 530 is affixed to the baler sidewall 506 such that the inner race member 536 will rotate relative to the outer race member 534. The inner race member 536 has a plurality of radially inwardly extending splines 538 having the preferred profiles described above.

A typical baler roller 516 is formed as an elongated cylinder 540 having a recess 542 (FIG. 5C) defined at opposite ends thereof. A mounting plate 544 provides a point of attachment for the roller shaft 150, such as by welding.

It has been found through testing that a bearing shaft combination which uses the splined inner race of the present invention eliminates the annoying "knocking" noise which occurs with bearings having a hexagonal inner race as described above and shown in FIGS. 1–1A. Comparative tests were conducted between conventional hex-shaped bearings similar to that depicted in FIGS. 1–1A and splined bearings constructed in accordance with the present invention similar to that depicted in FIG. 2. Testing was done both in a laboratory and in the field.

In laboratory testing, the hex-shaped bearing was installed in a tailgate portion of a White-New Idea Model 484 round baler. This tailgate portion included two drive rollers and two idler rollers. A pipe was attached to an adjustment bracket located on one of the sidewalls of the tailgate portion to act as a lever arm which enabled a misaligning force to be applied to the baler sidewall, bearing housing and bearing. Drive was applied to the rollers. While the rollers were brought up to speed (approximately 300 rpm), the hex-shaped bearing exhibited a loud pounding or knocking noise while the bearing sought to align itself. When the bearing aligned itself, the pounding or knocking noise stopped. A force was then applied to the pipe to simulate the forces exerted on the baler sidewall and roller and the pounding or knocking began again and continued while the force was applied. It is believed that this force caused the bearing outer race to move slightly in the bearing housing such that the bearing was out of alignment.

In contrast, a splined bearing was installed on the same test equipment. Drive was again applied to the rollers (approximately 300 rpm). The splined bearing did not exhibit any pounding or knocking while the rollers were brought up to speed. A similar misalignment force was applied to the pipe as was applied during the hex bearing test and no pounding or knocking noise was heard. Similar results were observed in field testing, that is, the hex bearing exhibited pounding or knocking noises during bale-forming. The splined bearing did not.

Accordingly, the use of splined bearings, and particularly with respect to a round hay baler, substantially eliminates the pounding or knocking noise associated with and encountered during use of conventional hex-shaped bearings.

It will thus be seen that the present invention provides a bearing assembly having a number of advantages and characteristics, including those herein indicated and others which are inherent in the invention. Since modifications and variations of the illustrated construction will be apparent to those skilled in the art, it is anticipated that such modifications and changes may be made without departing from the spirit of the invention or the scope of the appended claims.

What is claimed is:

1. In an anti-friction bearing with improved knocking reduction characteristics for use on a shaft member, the bearing having an inner race member which is received on the shaft member, an outer race member, the inner and outer race members defining a raceway therebetween, and a plurality of rolling elements disposed within the raceway, the rolling elements allowing relative movement between said inner and outer race members, and the inner race member having a shaft engagement portion, the improvement comprising: the inner race member shaft engagement portion having a plurality of splines formed thereon and extending radially inwardly from said bearing inner race member, each of the splines being separated by a plurality of intervening channels, each of said splines including a land portion and two face portions, the spline face portions providing said inner race member with a plurality of shaft engagement surfaces in a radially inwardly direction which slidingly engage a series of opposing splines formed on the said shaft member, said bearing inner race member and said splined shaft member slidingly engaging each other in a manner so as to permit limited axial movement between said inner race member and said shaft member, yet still permit inner driving engagement between said inner race member and said shaft member, said bearing inner race member, said splined shaft member and said sliding engagement therebetween cooperating to reduce knocking noises of said bearing during operation of said shaft.

2. The bearing of claim 1, further including a bearing housing which engages said outer race member.

3. The bearing of claim 2, wherein said outer race member rotates relative to said inner race member.

4. The bearing of claim 1, further including means for separating said plurality of rolling elements within said raceway.

5. The bearing of claim 1, wherein said rolling elements include ball elements.

6. The bearing of claim 1, wherein said rolling elements include roller elements.

7. The bearing of claim 1, wherein each of said inner race member splines have curved engagement surfaces.

8. The bearing of claim 1, wherein each of said splines are involute splines.

9. The bearing of claim 1, wherein said splined shaft member includes a distinct bearing engagement portion having a plurality of external splines extending radially outwardly from said shaft member, each of the shaft member splines of said splined shaft member bearing engagement portion having a land portion separated by two radially outwardly extending face portions, each of said shaft member splines further being separated from and spaced apart from each other by a series of external channels disposed in said shaft member engagement surface, said shaft member external splines being received within said bearing inner race member channels and said shaft member external channels receiving said bearing inner race member splines such that at least said bearing inner race member spline face portions and shaft member spline face portions slidingly engage each other when said bearing inner race member is placed upon said splined shaft member so as to permit said limited axial movement between said splined shaft member and said bearing.

10. The bearing of claim 9, wherein said shaft member further includes means to limit axial movement between said shaft member and said bearing.

11. The bearing of claim 10, wherein said axial movement limiting means includes a ring member disposed in a circumferential groove angularly disposed from said shaft member external splines.

12. The bearing of claim 1, wherein said splines are involute splines and said splines and said bearing inner race member are integrally formed.

13. The bearing of claim 1, wherein said splines extend substantially the entire length of said inner race member.

14. The bearing of claim 1, wherein said channels extend substantially the entire length of said inner race member.

15. The bearing of claim 1, wherein said inner race member includes a solid body portion without any non-shaft member-receiving openings formed therein.

16. An anti-friction bearing comprising: an inner race member, an outer race member concentrically disposed relative to the inner race member, said inner race member having a solid body with a groove disposed in an outer circumferential surface thereof, the outer race member also having a solid body with a groove disposed in an inner circumferential surface thereof, the inner race member groove and the outer race member groove cooperating to define a bearing raceway between said inner and outer race members, a plurality of rolling elements disposed in said raceway which permit relative movement between said inner and outer race members, said inner race member further including a circumferential inner engagement surface for engagement with a shaft member, the inner race engagement surface having a plurality of splines disposed therein, the splines extending radially inwardly of said inner race member, said splines being separated by a plurality of channels, each of said splines being an involute spline, said inner and outer race member splines slidingly engaging each other so as to permit limited axial movement between said inner race member and said shaft member, said inner race and shaft member splines and sliding engagement therebetween substantially reducing knocking noises from occurring during operation of said bearing.

17. An anti-friction bearing assembly comprising a bearing component and a shaft component, the bearing component including an inner race member, an outer race member concentrically disposed relative to the inner race member, said inner race member having a groove disposed in an outer circumferential surface thereof, the outer race member also having a groove disposed in an inner circumferential surface thereof; the inner race member groove and the outer race member groove defining a bearing raceway between said inner and outer race member, a plurality of rolling elements disposed in said raceway which permit relative movement between said inner and outer race members, said inner race member further including a circumferential inner engagement surface for engagement with the shaft component defining a shaft opening of said inner race member, the inner race engagement surface having a plurality of involute splines disposed thereon, the inner race splines extending radially inwardly of said inner race member, said inner race splines being separated by a plurality of intervening channels, each of said splines further having at least one engagement face thereon, said shaft component having an external circumferential engagement surface opposing said bearing inner race member engagement surface and engaging said inner race member engagement surface, said shaft component external engagement surface having a plurality of involute splines disposed thereon and extending radially outwardly and separated by a plurality of intervening channels, said shaft component external engagement surface being received with said shaft opening of said bearing component inner race member such that said shaft component involute splines are received within said inner race member intervening channels and said inner race member involute splines are received with said shaft member intervening grooves in a general sliding engagement which permits limited axial movement during operation of said bearing assembly, and, said bearing component inner race member splines, said shaft component splines and said sliding engagement therebetween cooperating to provide means for substantially reducing knocking noises of said bearing assembly during operation in association with said shaft.

18. The bearing assembly of claim 17, wherein said shaft includes means for limiting said sliding engagement between said bearing component and said shaft component.

19. The bearing assembly of claim 18, wherein said sliding engagement limiting means includes a stop member in the form of a stop ring extending radially outwardly from said shaft member.

20. The bearing assembly of claim 17, further including a housing member which houses said bearing component and which permits attachment of said bearing component to a mounting surface, said inner race member of said bearing assembly being stationary relative to said outer race member.

21. The bearing assembly of claim 17, wherein said inner race member involute splines are formed with a pressure angle of approximately 30°.

22. The bearing assembly of claim 21, wherein said outer race member rotates relative to said inner race member.

23. The bearing assembly of claim 17, wherein said inner race member includes a solid body without any non-shaft member-receiving openings extending therethrough.

24. A bearing assembly which substantially reduces knocking noises associated with the bearing assembly during operation thereof, the bearing assembly comprising an outer race member, an inner race member, a shaft member received within an opening of the inner race member, each of the inner and outer race members having an interior raceway disposed on opposing forces thereof, a plurality of rolling elements disposed in said disposed raceways between the inner and outer race members which permit relative movement between same, at least said inner race member having a solid body portion without any non-shaft member receiving openings formed therein, said inner race member further including a plurality of radial splines formed thereon separated by intervening grooves, said shaft member having a plurality of radial splines formed on an end portion thereof and being separated by intervening grooves, said shaft member end portion being received with said inner race member such that said shaft member splines and intervening grooves slidingly engage respective opposing inner race member grooves and splines, said inner race member splines, said shaft member splines and said sliding engagement therebetween providing means for substantially reducing knocking noises associated with said bearing during rotation of said shaft or bearing inner race member.

\* \* \* \* \*